(12) United States Patent
Wu

(10) Patent No.: US 10,661,333 B2
(45) Date of Patent: May 26, 2020

(54) CASTING METHOD USING COMBINED 3D PRINTED SHELL MOLD AND THE COMBINED SHELL MOLD USED IN THE METHOD

(71) Applicant: Cheng-Kuan Wu, Lianyungang (TW)

(72) Inventor: Cheng-Kuan Wu, Lianyungang (TW)

( * ) Notice: Subject to any disclaimer, the term of this patent is extended or adjusted under 35 U.S.C. 154(b) by 28 days.

(21) Appl. No.: 16/022,716

(22) Filed: Jun. 29, 2018

(65) Prior Publication Data

US 2019/0001406 A1 Jan. 3, 2019

(30) Foreign Application Priority Data

Jul. 1, 2017 (CN) .......................... 2017 1 0529214

(51) Int. Cl.
| | | |
|---|---|---|
| B22C 13/08 | (2006.01) | |
| B22C 9/08 | (2006.01) | |
| B33Y 80/00 | (2015.01) | |
| B22D 27/04 | (2006.01) | |
| B33Y 10/00 | (2015.01) | |
| B28B 1/00 | (2006.01) | |

(52) U.S. Cl.
CPC .............. B22C 13/08 (2013.01); B22C 9/082 (2013.01); B22D 27/04 (2013.01); B28B 1/001 (2013.01); B33Y 10/00 (2014.12); B33Y 80/00 (2014.12)

(58) Field of Classification Search
CPC .......... B33Y 10/00; B33Y 80/00; B22C 13/08
See application file for complete search history.

(56) References Cited

U.S. PATENT DOCUMENTS

| | | | | |
|---|---|---|---|---|
| 3,404,724 A | * | 10/1968 | Baker ..................... | B22C 23/00 164/138 |
| 3,989,089 A | * | 11/1976 | Deguchi ............... | B22C 15/245 164/201 |
| 4,108,188 A | * | 8/1978 | McMullen ................ | B22C 5/08 134/57 R |
| 6,354,357 B1 | * | 3/2002 | Clark ..................... | B22C 7/023 164/137 |
| 6,418,889 B1 | * | 7/2002 | Manabe .................... | B22C 9/10 123/41.74 |
| 6,463,991 B1 | * | 10/2002 | Reelfs ....................... | B22C 5/06 164/137 |
| 2006/0100734 A1 | * | 5/2006 | Huang ................... | B33Y 10/00 700/119 |
| 2010/0006252 A1 | * | 1/2010 | Roby ....................... | B22C 7/02 164/15 |

* cited by examiner

*Primary Examiner* — Charlie Y Peng

(57) ABSTRACT

A casting method using combined 3D printed shell mold and the combined shell mold used in the method. The method consists of shell mold making and casting steps. The shell mold is constructed by combination. First, the 3D printer at least prints out a runner part and several pattern die parts for molding products. In the print run, the first interfaces corresponding to the quantity of pattern die parts are printed out integrally on the runner part. The second interfaces corresponding to the first interfaces are formed on the pattern die parts. Afterwards, the first interfaces and the second interfaces are butted, the primary runner in runner part is connected to the die cavities in pattern die parts, the runner part and pattern die parts are combined to form a shell mold for casting multiple products at a time.

8 Claims, 4 Drawing Sheets

CASTING METHOD USING COMBINED 3D PRINTED SHELL MOLD AND THE COMBINED SHELL MOLD USED IN THE METHOD

BACKGROUND OF INVENTION

1. Field of the Invention

The present invention relates generally to the technical field of precision casting technique, and more particularly to a casting method using combined 3D printed shell mold and the combined shell mold used in the method.

2. Description of Related Art

The present precision casting technique mostly uses dewaxing casting, the manufacturing technique is:

(1) The drawings are made according to the product to be processed, and the corresponding mold is made according to the drawings.

(2) The wax matrix is made by using the mold and injection molding, and the wax matrix is corrected.

(3) Several wax modules are assembled to form a wax tree, so as to cast multiple products at a time to increase the working efficiency.

(4) The wax tree is treated by gum dipping, so that a layer of paste adheres to the surface of wax tree. When the paste is dry, the gum dipping is performed many times to guarantee the thickness of the gum dipped shell mold. Generally, the gum dipping technique is repeated 5-6 times, the thickness of shell mold is 5-7 mm.

(5) When the gum dipping technique is completed, the steam dewaxing is used to let the wax matrix flow out of the shell mold, so as to separate the wax matrix from the shell mold.

(6) When dewaxing is completed, the shell mold shall be sintered, the paste forming the shell mold is sintered and cured, and the residual wax matrix material is burnt up.

(7) The sintered shell mold is used as casting mold cavity, the molten raw material (e.g. molten metal, molten glass, etc.) is injected into it, and molded in the shell mold. Finally, the whole shell mold is taken out and broken to obtain the molded product.

(8) The molded product is treated by sand removal and ball blast to obtain the finished product.

Therefore, the present dewaxing casting technique is very complex, and the dewaxing, sintering and sand removal techniques result in contamination. Meanwhile the wax matrix manufacturing process is very complex, manual "tree formation" is required, all of these lead to low production efficiency.

On the other hand, the 3D printing technique is developing rapidly, and it has been used in many fields. The present 3D printing is a rapid forming technique in nature, the working process is that a model is built by using computer modeling software, and then the built 3D model is "divided" into sections layer by layer, i.e. slices, so as to guide the printer to print layer by layer, and the thin layers are stacked up till a solid object is molded. The major difference between the multifunctional 3D printer and traditional printers is that its "ink" is generally hot-melt adhesive string, waxy and powdered materials.

This inventor imported 3D printing technique into the field of dewaxing casting through continuous research and experiments, and proposed a casting method using 3D printing to make shell mold, see Chinese patent application number 201510797150.4. The 3D printed shell mold scheme used by the technical proposal is integrated molding, when the drawing is designed by computer, the 3D printer prints out the whole shell mold at a time. As this scheme is used for precision casting, the 3D printed shell mold scheme mainly uses glue jet cementing or laser sintering of fireproof powdered material, e.g. ceramics, in short, the powder is laid layer by layer on the printing platform of 3D printer, the thickness of each layer of powder depends on the required accuracy of the final product. Afterwards, the manipulator driven "printing head" performs gel spray or laser sintering along the preset pattern, and then the powder is laid again. The printed product is formed after the "printing" layer by layer. In subsequent research process, this inventor found that the technical proposal still has some deficiencies, described below:

1. The powder cementing layer by layer or sinter curing molding is used, when the printing is completed, the uncured powdered material shall be cleaned out. However, in the precision casting process, the cast usually has no regular contour, and in order to cast multiple casts at one time, the shell mold for casting is usually "tree-like" shell mold, comprising a primary runner and several pattern dies for molding the required cast. The pattern dies are tree shaped and located on the side of primary runner, so that the channel formed between the runner in primary runner and the pattern die cavity is very zigzag. If the integrated "print" molding is used, it is difficult to remove the residual powder from the pattern die cavity, so that the final cast has deformity or surface asperity, forming a defective.

2. At present, the whole shell mold is molded by "printing" at a time, the 3D printing technique is very difficult. If a part of the printed shell mold is defective, the whole shell mold will be rejected, that is a serious waste; and the product with more complex structure has higher probability of printing defects. In order to reduce the printing defects, the only way is to reduce the structural complexity of the printed product, but the range of 3D printing is limited.

3. The 3D printing technique has progressed significantly, but the printing efficiency is still low, especially for the products of complex construction, the defects are likely to occur in the print run, and the printing efficiency is low, the efficiency of printing acceptable shell molds is very low.

As mentioned above, the present invention proposes the following technical proposal.

SUMMARY OF THE INVENTION

The present invention aims to overcome the deficiencies in the existing technology to provide a casting method using combined 3D printed shell mold and the combined shell mold used in the method. The technical method is used in a casting method using a combined 3D printed shell mold, comprising: firstly printing a shell mold through a 3D printer; and then burying the shell mold in a sand box and reserving for a casting water gate; casting molten metal material into the shell mold and being molded therein; finally, removing the entire shell mold from the sand box and breaking the shell mold to take out a molded product; wherein the method for producing the shell mold is that the shell mold is formed in a combined manner, comprising: printing of a runner part (1) of the shell mold and a plurality of pattern die parts (2) for forming the product by the 3D printer, and integrally printing a plurality of first interfaces (13) corresponding to the plurality of pattern die parts (2) on the runner part (1); the pattern die parts (2) are formed with a plurality of second interfaces (21) corresponding to the plurality of first interfaces (13); connecting the first interfaces (13) with the second interfaces (21) so that a primary runner (1) in the runner part (1) is communicated with die cavities in the pattern die parts (2) combining the runner part (1) with the pattern die parts (2) to form a shell mold capable of casting a plurality of products at a time.

More preferably, wherein the pattern die part (2) uses one-step 3D printing molding or combined 3D combined 3D printing molding according to the complexity of product shape;

the combined 3D printing molding is that a plurality of pattern die elements (20) are printed by the 3D printer and combined with each other to form a desired pattern die part (2).

More preferably, wherein the 3D printing is to spray adhesive micro-droplets layer by layer, so that the printing powder materials are formed layer by layer and stacked to form a 3D printed blank.

More preferably, wherein the 3D printing is to cover the printing powder materials layer-by-layer and use laser sintering and stack to form a 3D printed blank.

More preferably, wherein the printing materials uses ceramic powder or gypsum powder.

More preferably, wherein the powdered material remaining in the runner part (1) and die cavity of pattern die part (2) is cleaned in advance, and then the cleaned runner part (1) and pattern die part (2) are combined to form the shell mold.

More preferably, wherein the casting is performed in a vacuum or negative pressure environment; the sand box (5) includes steel balls (51) disposed therein and an electromagnetic induction heating unit (52) for heating the steel balls (51) disposed thereoutside.

A combined shell mold used in the casting method comprises a runner part (1) and a plurality of pattern die parts (2) for molding products of shell mold printed by 3D printer, wherein the runner part (1) includes a primary runner (11), a gate (12) formed at a top of primary runner (11) and a plurality of first interfaces (13) located on sides of primary runner (11); the pattern die part (2) includes a die cavity part (21) and a second interface (22) corresponding to the first interface (13); the pattern die part (2) is connected to a cavity inside the runner part (1) through the connection of the first interface (13) and the second interface (22), so that the runner part (1) and pattern die parts (2) are combined to form a shell mold for casting a plurality of products at a time.

More preferably, wherein the first interface (13) and the second interface (22) are connected by a plug-in connection; or the first interface (13) and the second interface (22) are connected by a threaded connection.

More preferably, wherein the pattern die part (2) includes at least two pattern die elements (20).

In comparison to the existing technology, the present invention has the following advantages:

1. The present invention splits the whole shell mold into runner part and pattern die part. The pattern die part of complex construction can be split and molded, and then assembled, thus the component structures are simplified, so that it is convenient to clean the residual powdered material for 3D printing out of each component, guaranteeing the cleanliness of the final combined shell mold cavity and the quality of cast.

2. The present invention splits the whole shell mold into runner part and pattern die part. The pattern die part of complex construction can be split and molded, and then assembled. Each component structure for assembly is relatively simple, which can be completed rapidly by 3D printer, and the percent of pass of products is increased greatly. Afterwards, the runner part and pattern die part are combined by inserting to form the shell mold for casting, so as to make shell molds in complex shapes, and multiple products can be cast at a time as required.

3. The runner part in the present invention can be used as standard part, the pattern die parts in different shapes use the interface of the same specification, so that different pattern die parts share the same runner part, the design of shell mold is reduced, the normalization is implemented, the quality of product and production efficiency are enhanced.

4. In addition, a complicated product can be made by combination, which is to say, the pattern die part comprises two (or more) elements, thus the structure of each element can be further simplified to facilitate mass production.

5. The present invention can be completed by combining the pattern die parts of multiple different casts into one shell mold as required, the production cost of mini-batch casts can be further reduced.

6. The present invention uses steel balls to replace the sand soil and grains in the existing sand box, which have the effectiveness of the original sand grains, the outside of shell mold is compacted and supported, the relatively thin shell mold can resist the impact force during casting, and the steel balls can be heated by electromagnetic induction system, so as to heat up the shell mold. The heated shell mold is more favorable for casting operation, preventing the shell mold breakage or runner clogging resulted from excessive temperature differentials.

To sum up, the 3D printing combination of shell mold of the present invention is fast and easy to modify.

DETAILED DESCRIPTION OF THE INVENTION

Figure 1:
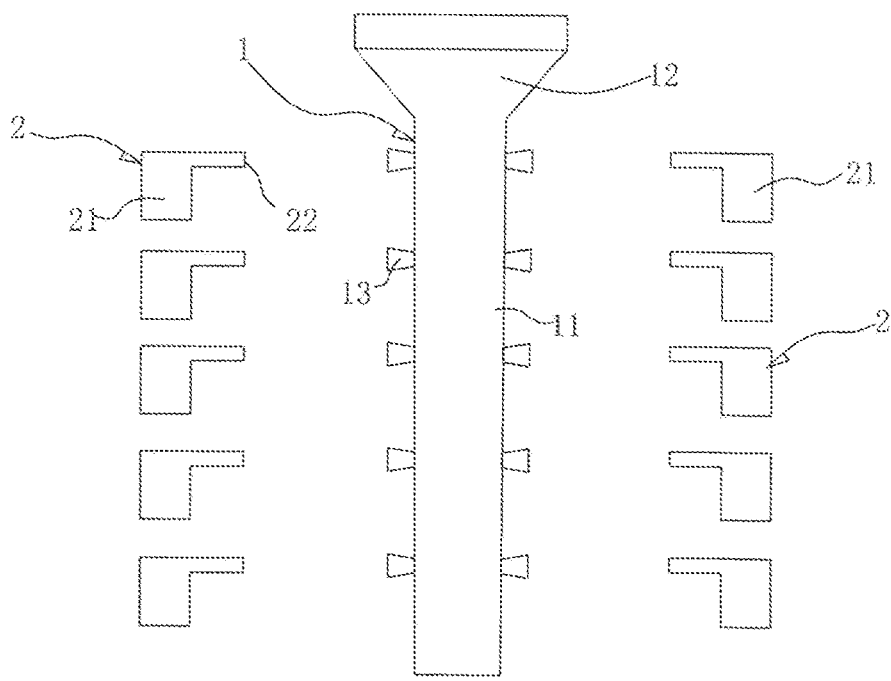
FIG. 1 is a schematic structural view before combination of an embodiment 1 of shell mold in the present invention.

The method of the present invention comprises making shell mold and casting. First, the shell mold is printed by 3D printer as the production requires, and then the shell mold is buried in sand, the shell mold is buried in the sand box, the casting water gate is reserved. Afterwards, the molten metal material is poured into the shell mold, and molded in the shell mold. Finally, the whole shell mold is taken out, the shell mold is broken to obtain the molded product. To be specific, the method of the present invention is described below:

First, the drawing is made by computer according to the product to be processed. A drawing software exportable to 3D printing is used in general.

Secondly, the finished drawing is imported into the 3D printer for 3D printing of shell mold. The 3D printing method used in the present invention is microdroplet jet binding, the binder microdroplets are jetted layer by layer to mold and superpose the printing powdered material covered layer by layer, so as to form the 3D printed body. In short, the powder is laid layer by layer on the printing platform of 3D printer, and the thickness of each layer of powder will depend on the required accuracy of the final product. Afterwards, the manipulator driven "printing head" jets gel following the preset pattern, and the powder is laid again, the final printed product is formed after such "printing" layer by layer. Certainly, each layer of powder can be sintered by laser in the aforesaid method. Whichever method is used, the 3D printing still uses layer by layer print mode of layered "slice". According to the requirement for printed product accuracy, the thickness of each layer of powder is 25-100 μm. The powdered material for printing is usually ceramic or gypsum powder material.

Figure 2:
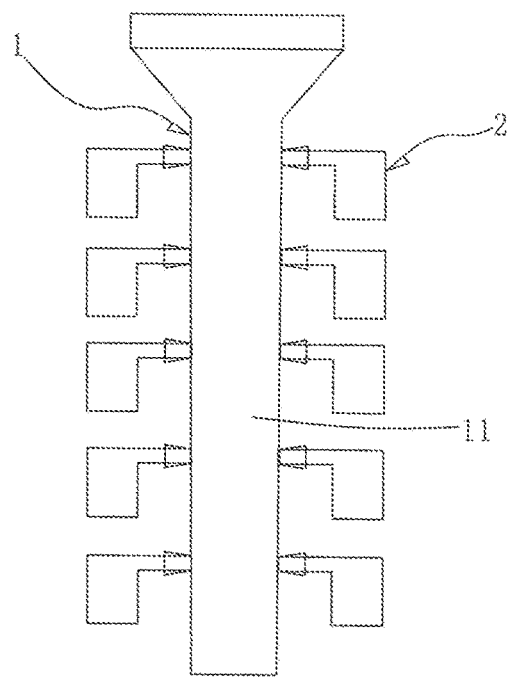
FIG. 2 is a schematic structural view after combination of the embodiment 1 of shell mold in the present invention.

As shown in FIGS. 1-2, the aforementioned shell mold is constructed by combination. First, the 3D printer at least prints out runner part 1 and several pattern die parts 2 for molding products. In the print run, the first interfaces 13 corresponding to the quantity of pattern die parts 2 are printed out integrally on runner part 1, the second interfaces 22 corresponding to the first interfaces 13 are molded on pattern die parts 2. When the first interfaces 13 and the second interfaces 22 are butted, the primary runner 11 in runner part 1 is connected to the die cavities 21 in pattern die parts 2, the runner part 1 and pattern die parts 2 are combined to form a shell mold for casting multiple products at a time.

The powder removal process shall be performed before the aforementioned shell mold is combined, namely, the powdered material for printing left in runner part 1 and pattern die parts 2 is cleaned up, and then the cleaned runner part 1 and pattern die parts 2 are combined to form the shell mold. As the casts have no regular contours in general, in order to form multiple casts at a time, the shell mold for casting is usually "tree-like" shell mold, which comprises a primary runner 11 and several pattern die parts 2 for molding the required cast, the pattern die parts 2 are tree shaped and located on the sides of primary runner 1, so that the channel formed between the runner in primary runner 11 and the die cavity 21 in pattern die part 11 is very zigzag. When the traditional integral "print" molding is used, it is difficult to remove the residual powder from the pattern die cavity, so that the final cast has deformities or surface asperity, forming a defective. The present invention splits and "prints" the shell mold, so the structure of each component is relatively simplex, the residual powdered material for printing can be poured out smoothly and cleaned up, and then the shell mold cavity is free of residual powdered material after combination, guaranteeing the cast product quality.

The shell mold shall be cast after assembly, namely, the combined shell mold is used as casting mold cavity, the molten raw material is injected into it and molded in the shell mold. Finally, the whole shell mold is taken out, the shell mold is broken to obtain the molded product. In this step, as the 3D printed shell mold is formed by curing glue directly (or laser sintering), its strength cannot bear the impact of direct casting of molten metal material, the shell mold shall be buried in sand. The shell mold is buried in the sand box, the casting water gate is reserved, and the sand box is vibrated to consolidate the sand outside the shell mold. The casting is performed at last, and then the whole shell mold is taken out of the sand box, the shell mold is broken to obtain the molded product.

Figure 4:
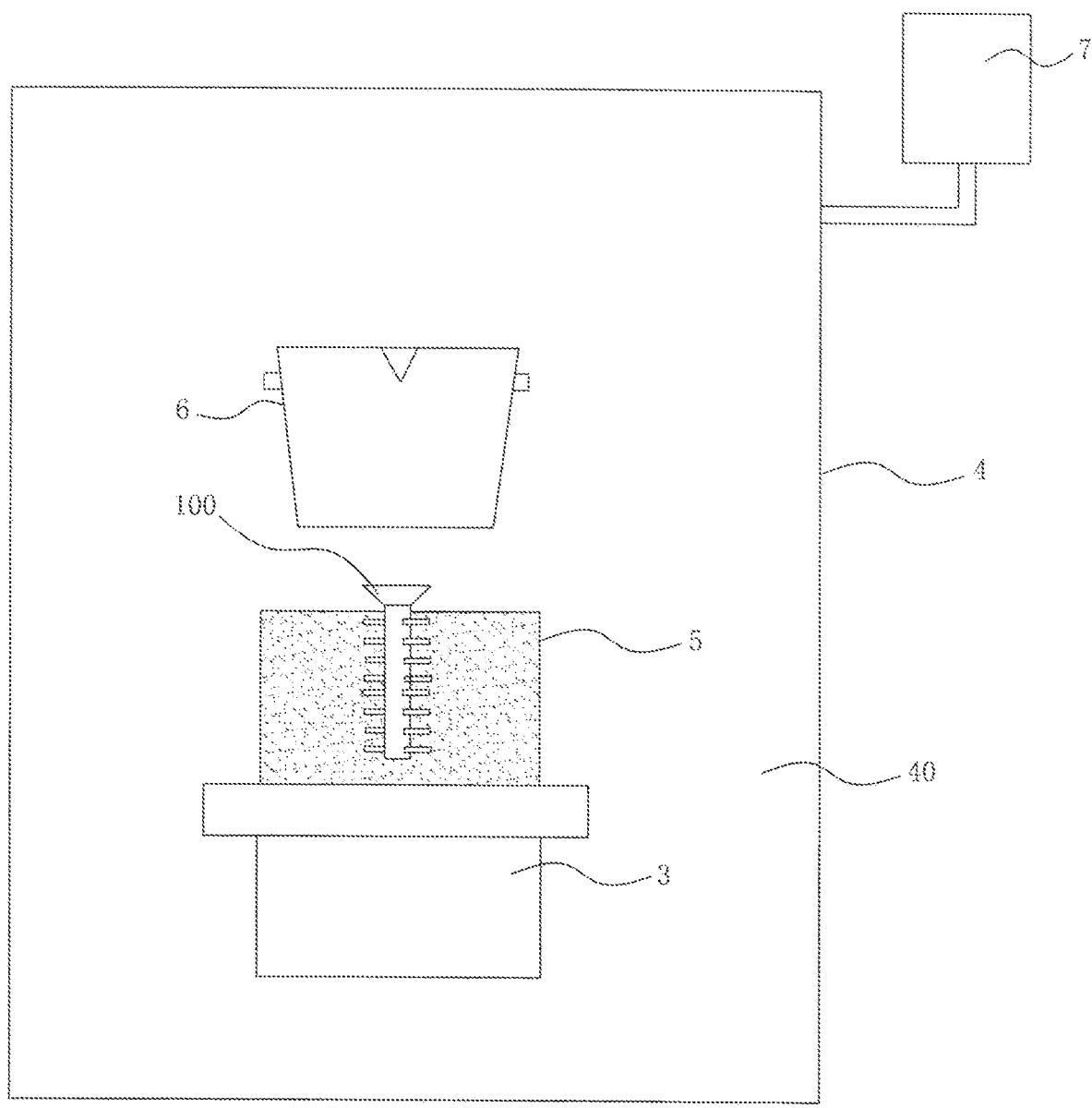
FIG. 4 is a schematic structural view of casting mechanism in the present invention.

As shown in FIG. 4, the following vacuum casting device can be used in the aforesaid casting process, which comprises a vacuum case 4, the vacuum case 4 has a confined space 40, a sand box 5 and a rotary electric furnace 6 are located in the aforementioned space 40; an air pump 7 for vacuum pumping is installed outside the aforementioned space 40. A vibrator 3 is located in the aforementioned space 40. The aforementioned sand box 5 is placed on the vibrator 3. The 3D printed assembled shell mold 100 is buried in sand box 5. The vibrator 3 compacts the sand outside shell mold 100 by vibration. The filling opening of the aforementioned shell mold 100 is exposed on the sand surface of sand box 5, aligned with the outlet of electric furnace 6. The electric furnace 6 rotates to inject the molten material into the filling opening of shell mold 1.

In the casting process, in order to prevent the cast product from bubbles, the overall casting process is performed in the vacuum space (or negative air pressure space) 40 in vacuum case 4. The space 40 is connected to a vacuum pump 7 to vacuumize the space 40. The shell mold 100 is buried in the sand box 5, the casting water gate is reserved, and the vibrator 3 vibrates the sand box 5 to compact the sand outside the shell mold 100. Finally, the space 40 is closed and vacuumized to make negative pressure in space 40.

The electric furnace 6 is driven directly during casting, the molten material is poured into the corresponding shell mold 100. After casting, when the material is half solidified, the vacuum pump 7 can be switched off, the air pressure in the space 40 is equivalent to the outside gradually, this is favorable for molding. Finally, when the whole product is cooled and solidified, the whole shell mold 100 is taken out of the sand box 5, and the shell mold 100 is broken to extract the molded product.

The aforesaid vacuum casting device is used, the shell mold 100 is buried in sand box 5 during casting, the vibrator 3 vibrates sand box 5 to compact the sand outside the shell mold 100. The casting sand in the sand box supports the exterior of shell mold 1. As the shell mold 100 is printed by 3D printer, it is very thin, and it is formed by assembly, its strength is low. When the sand forms a firm support outside, the shell mold 100 will not break in the casting process, the overall casting can be completed smoothly.

Finally, the ball blast treatment is required after molding, the finished product is obtained.

In the aforesaid embodiment, the first interfaces 13 and the second interfaces 22 can be fitted by flared inserting, as shown in FIG. 1. This interface is relatively simple, the interface precision requirement is not high, the mutual inserting is implemented by their taper. After the combination is completed, the overall casting is performed in the sand box, the sand in the sand box supports the shell mold, so the interface precision requirement is not high. Certainly, the first interface 13 and the second interface 22 can be connected by thread, which is to say, the first interface 13 and the second interface 22 are matched internally threaded or externally threaded sleeve respectively, and connected by thread.

In the aforesaid embodiment, the runner part 1 and pattern die parts 2 of shell mold are "printed" respectively. The pattern die parts 2 can be products in the same shape or in different shapes. For small batch cast products, multiple pattern die parts 2 in different shapes and the same runner part 1 are combined, so as to mold the casts in different shapes in turn. In practical production process, the runner part 1 can be used as standard part, the pattern die parts 2 in different shapes use the second interfaces 22 of the same specification, so that different pattern die parts 22 can share the same runner part, the design of shell mold is reduced, the normalization is implemented, the quality of product and production efficiency are enhanced.

Figure 3:
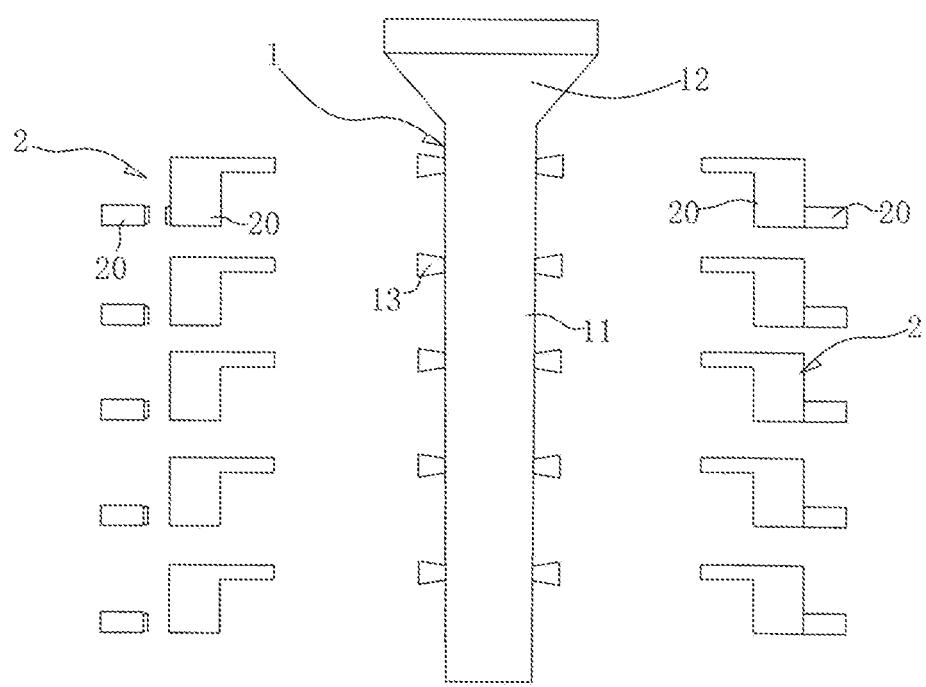
FIG. 3 is a schematic structural view before combination of an embodiment 2 of shell mold in the present invention.

In addition, many casts have complex structures, the pattern die parts 2 for molding have relatively complex structures, the internal die cavity is too zigzag, it is hard to clean out the residual powder by gravity directly. Therefore, in the physical production process, according to the complexity of cast product shape, and considering the difficulty in removing residual powder, the pattern die parts 2 in complex shapes can be molded by combined 3D printing, the principle is identical with the combination of runner part 1 and pattern die parts 2 in the aforesaid Embodiment 1. As shown in FIG. 3, in Embodiment 2, the 3D printer prints out several pattern die elements 20 of pattern die part 2. These pattern die elements 20 are combined to form the required pattern die part 2. The elements 20 can be buckled or inserted, the pattern die part 2 can be split according to actual production requirements.

The present invention splits the whole shell mold into runner part 1 and pattern die parts 2. The pattern die parts 2 in complex shapes can be split and molded, and then assembled, thus the component structures are simplified, so that it is convenient to clean the residual powdered material for 3D printing out of each component, guaranteeing the cleanliness of the final combined shell mold cavity and the quality of cast.

In addition, the pattern die parts in complex shapes can be molded respectively, and then assembled. Each component structure for assembly is relatively simple, which can be completed rapidly by 3D printer, and the percent of pass of products is increased greatly. Afterwards, the runner part and pattern die part are combined by inserting to form the shell mold for casting, so as to make shell molds in complex shapes, and multiple products can be cast at a time as required.

Figure 5:
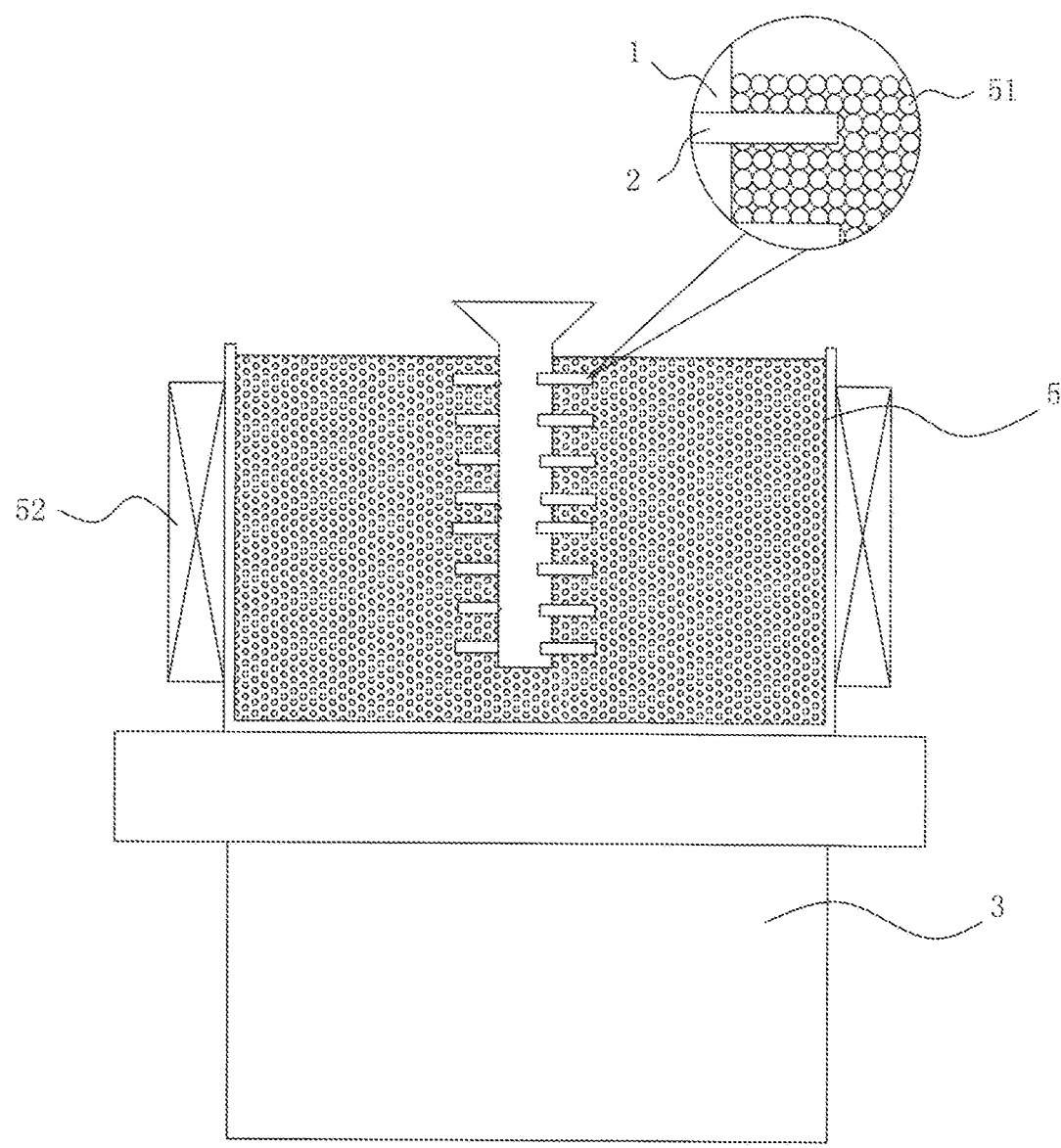
FIG. 5 is a schematic structural view of another embodiment of casting mechanism in the present invention.

In addition, as the present invention uses 3D printing, the shell mold is relatively thin. In order to avoid the molten material impacting the shell mold in the casting process, the 3D printed and assembled shell mold shall be buried in sand before casting. However, the traditional sand box 5 has a defect that it is difficult to heat the shell mold, even if the shell mold is heated by sintering before it is buried in sand, as the shell mold temperature is very high, it is difficult for the operator to bury it in sand. Therefore, for casting some precision workpieces, the defect rate increases. At present, the sand grains for sand casting are mostly sand soil, which is difficult to be heated up. Therefore, in order to upgrade the casting quality, the sand box 5 is improved in the present invention, as shown in FIG. 5, in this embodiment, the shell mold is buried in the sand box 5 filled with steel balls 51, and an electromagnetic induction heating unit 52 for heating steel balls 51 is located outside the sand box 5.

The diameter of the aforementioned steel balls 51 is 5-20 mm. A large sized shell mold can use steel balls in large diameter, and a small sized shell mold can use steel balls in small diameter. The diameter of steel balls 51 shall match the volume of shell mold. Oversize steel balls may fail to support the shell mold effectively. If the steel ball diameter is too small, there may be temperature distortion.

The electromagnetic induction heating unit 52 in this embodiment uses medium frequency heating, medium frequency AC is imported to generate alternating magnetic field, the surface of steel balls 51 is heated rapidly. The steel balls 51 heating temperature is usually kept at 400° C.-600° C. When the molten material is injected into the shell mold, the shell mold will not break under sudden heating, and the molten material will not be solidified suddenly to block up the runner. On the other hand, the steel balls 51 in sand box 5 support the shell mold effectively, and resist the impact of molten material, guaranteeing the integrity of shell mold.

I claim:

1. A casting method using a combined 3D printed shell mold, comprising:

firstly printing a shell mold through a 3D printer;

and then burying the shell mold in a sand box and reserving for a casting water gate;

casting molten metal material into the shell mold and being molded therein;

finally, removing the entire shell mold from the sand box and breaking the shell mold to take out a molded product;

wherein the shell mold is formed in a combined manner, comprising:

printing of a runner part (1) of the shell mold and a plurality of pattern die parts (2) for forming the product by the 3D. printer, and integrally printing a plurality of first interfaces (13) corresponding to the plurality of pattern die parts (2) on the runner part (1); the pattern die parts (2) are formed with a plurality of second interfaces (21) corresponding to the plurality of fist interfaces (13);

connecting the first interfaces (13) with the second interfaces (21) so that a primary runner (11) in the runner part (1) is communicated with die cavities in the pattern dic parts (2)

combining the runner part (1) with the pattern die parts (2) to form the shell mold capable of casting a plurality of products at a time;

wherein the casting is performed in a vacuum or negative pressure environment; the sand box (5) includes steel balls (51) disposed therein and an electromagnetic induction heating unit (52) for heating the steel balls (51) disposed thereoutside.

2. The casting method using a combined 3D printed shell mold according to claim 1, wherein the pattern die part (2) uses one-step 3D printing molding or combined 3D combined 3D printing molding according to the complexity of product shape;

the combined 3D printing molding is that a plurality of pattern die elements (20) are printed by the 3D printer and combined with each other to form a desired pattern die part (2).

3. The casting method using a combined 3D printed shell mold according to claim 2, wherein the 3D printing is to spray adhesive micro-droplets layer by layer, so that printing powder materials are formed layer by layer and stacked to form a 3D printed blank.

4. The casting method using a combined 3D printed shell mold according to claim 2, wherein the 3D printing is to cover the printing powder materials layer-by-layer and use laser sintering and stack to form a 3D printed blank.

5. The casting method using a combined 3D printed shell mold according to claim 1, wherein the printing materials uses ceramic powder or gypsum powder.

6. The casting method using a combined 3D printed shell mold according to claim 1, wherein the powdered material remaining in the runner part (1) and die cavity of pattern die part (2) is cleaned in advance, and then the cleaned runner part (1) and pattern die part (2) are combined to form the shell mold.

7. A combined shell mold used in the casting method according to claim 1 comprises: a runner part (1) and a plurality of pattern die parts (2) for molding products of shell mold printed by 3D printer, wherein the runner part (1) includes a primary runner (11), a gate (12) formed at a top of primary runner (11) and a plurality of first interfaces (13) located on sides of primary runner (11);

the pattern die part (2) includes a die cavity part (21) and a second interface (22) corresponding to the first interface (13); the pattern die part (2) is connected to a cavity inside the runner. part (1) through the connection of the first interface (13) and the second interface (22), so that the runner part (1) and pattern die parts (2) are combined to form a shell mold for casting a plurality of products at a time; wherein the first interface (13) and the second interface (22) are connected by a plug-in connection; or the first interface (13) and the second interface (22) are connected by a threaded connection.

8. The combined shell mold according to claim 7, wherein the pattern die part (2) includes at least two pattern die elements (20).

* * * * *